Feb. 26, 1963 — J. J. TOROK — 3,078,696
PLUNGER FOR FORMING GLASS ARTICLES
Filed Sept. 25, 1958 — 2 Sheets-Sheet 1

INVENTOR.
JULIUS J. TOROK
BY W. A. Schaich
& E. J. Hollen
ATTORNEYS

INVENTOR.
JULIUS J. TOROK
BY W. A. Schaich
& E. J. Holler
ATTORNEYS

United States Patent Office 3,078,696
Patented Feb. 26, 1963

3,078,696
PLUNGER FOR FORMING GLASS ARTICLES
Julius J. Torok, Toledo, Ohio, assignor to Kimble Glass
Company, a corporation of Ohio
Filed Sept. 25, 1958, Ser. No. 763,351
10 Claims. (Cl. 65—356)

This invention relates to forming articles and particularly to forming glass articles having a base portion and a peripheral flange portion.

Glass articles such as television tube faces and glass block halves are customarily formed by placing a gob of hot molten glass in a mold having an internal molding surface corresponding to the external configuration of the article to be formed and moving a plunger downwardly into contact with the glass to displace the glass and form the glass article. The plunger has an external molding surface corresponding to the internal configuration of the article which is to be formed. It is extremely important in such a method that the glass-forming surfaces should not be too hot or too cold. If the glass-forming surfaces are too hot, the glass will stick thereto and if the glass-forming surfaces are too cold the glass will crizzle or form what are commonly known as "chill wrinkles." It is apparent that either of these conditions is undesirable and it is essential for low-cost and successful manufacture of glass articles that the extreme temperature conditions be avoided.

Where the glass article which is being formed is flat or has slightly curved surfaces in one plane the control of temperature of the glass-forming surfaces is relatively easy, but where there are sharp curves in the glass article connecting several portions thereof the problem of temperature control becomes more difficult. Such sharp curves are found in glass articles such as the face plates of television tubes and glass block halves which have a base portion and a flange portion connected to the base portion and extending therefrom at an angle on the order of 90°. In the making of such articles there is a tendency for both hot and cold areas to be present at the same time on the glass-forming surfaces so that the glass may tend to stick in one area and crizzle in another at the same time. This makes the problem of control of the temperature of the forming surfaces extremely difficult.

It is an object of this invention to provide an apparatus for forming glass articles having a base portion and a flange portion wherein the glass-forming surfaces do not exceed the limits of working temperatures of the glass thereby avoiding sticking of the glass and the formation of crizzles or chill wrinkles in the glass.

Figure 1:
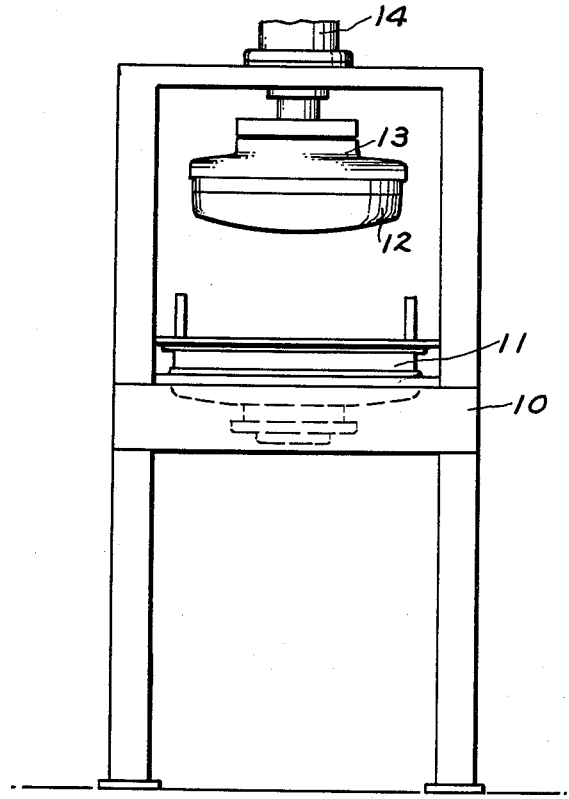
FIG. 1 is an elevational view of a portion of a molding apparatus.

Referring to FIG. 1, the conventional apparatus for forming a glass article such as a television tube face or a glass block half having a base and a flange comprises a support 10 for a mold 11 having an internal molding surface corresponding to the external configuration of the glass article which is to be formed. A plunger 12 having an external surface corresponding to the internal configuration of the article which is to be formed is mounted on a head 13 for reciprocating movement relative to support 10 by suitable means such as a hydraulic ram 14.

Figure 2:
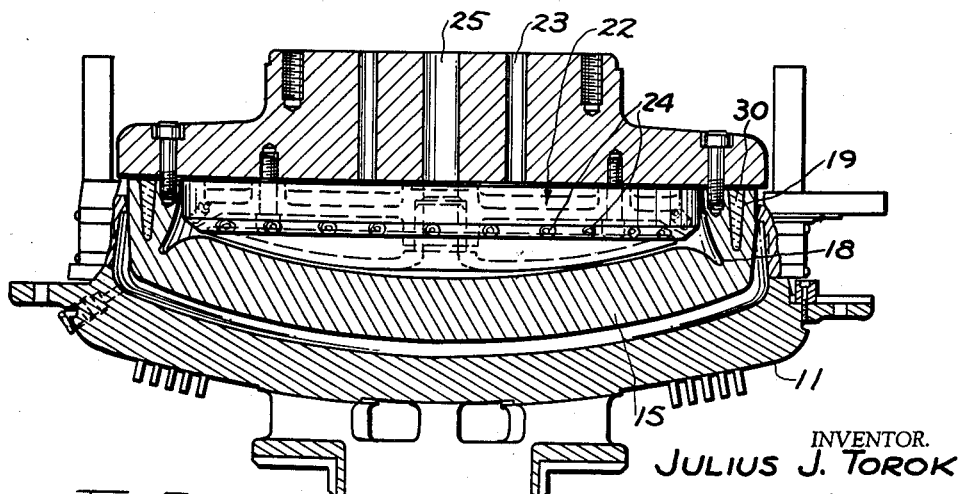
FIG. 2 is a sectional elevational view showing a plunger embodying the invention.
Figure 3:
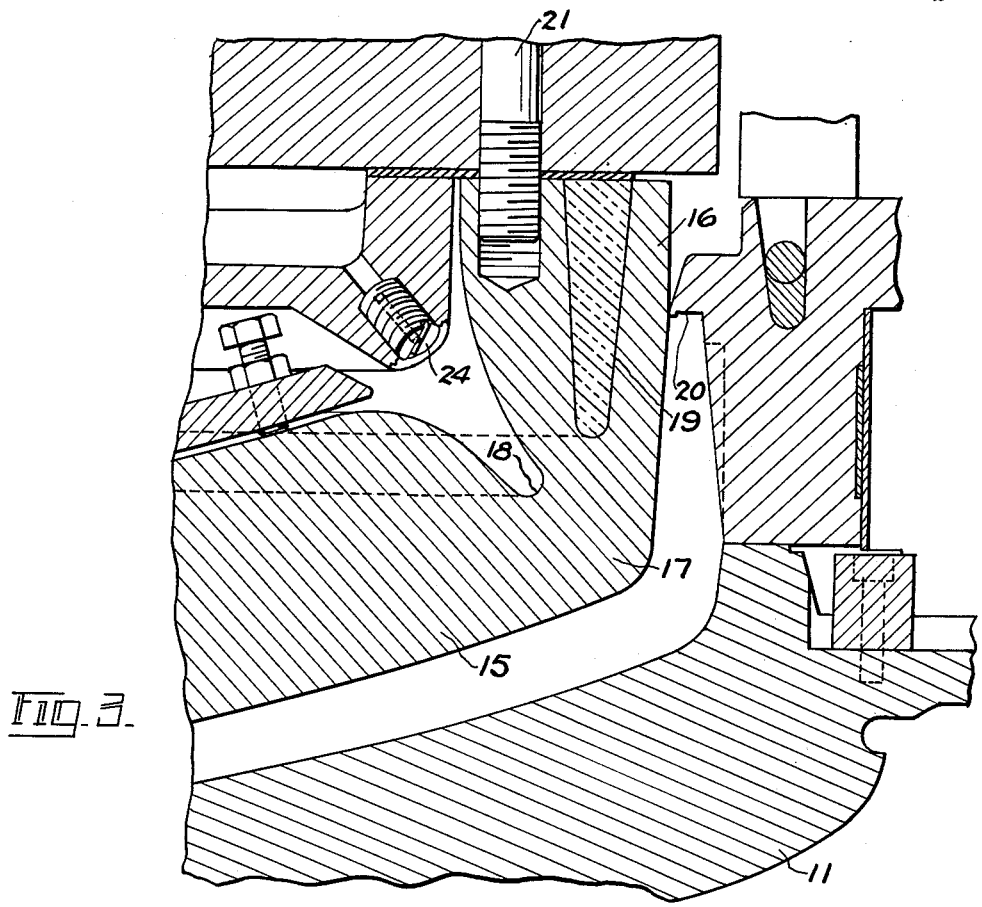
FIG. 3 is a fragmentary sectional view of a portion of the apparatus shown in FIG. 2.

As shown in FIGS. 2 and 3, plunger 12 comprises a base portion 15 of substantially uniform thickness and a flange portion 16 extending upwardly from the periphery of the base portion 15 at about 90° and connected to the base portion 15 by an area of juncture 17. Plunger 12 is formed with a peripheral groove 18 in the surface opposite the glass molding surface at the area of juncture 17 of the base 15 and flange 16. Groove 18 is of substantially increasing or tapered cross section from the base to the open end thereof and is generally uniform in cross section throughout the periphery of the plunger 12.

Flange portion 16 is formed with a peripheral slot 19 which extends around the entire periphery of the plunger. As shown in FIGS. 2 and 3, the upper end of flange portion 16 extends above the upper end of the glass article which is to be formed, which is determined by the surface 20 on the mold. Slot 19 is of substantially uniform depth throughout and the lower end of the slot terminates below the upper end of the flange of the glass article which is to be formed. The depth of slot 19 is such that it always extends below the uppermost level of glass, that is the upper end of the flange on the glass article. The width of the slot 19 is not critical. The slot 19 may be either vertical or inclined inwardly or outwardly as desired.

Plunger 12 is supported on head 13 by bolts 21. A coolant distributor 22 is mounted on head 13 between plunger 12 and head 13 and liquid coolant is supplied thereto through openings 23 in the head. The liquid coolant is preferably directed by nozzles 24 in the distributor 22 against the base of the groove 18 at an angle to a radial line intersecting the axis of the plunger so that a rotary motion is imparted to the liquid coolant. The liquid coolant thereafter flows along the base portion 15 of the plunger below the distributor 22 and is removed through an axial opening 25 in the head 13. This method and apparatus for cooling the plunger 12 is more completely disclosed and claimed in my copending application Serial No. 763,384, titled "Forming Glass Articles," filed on the same date as the present application.

In operation the liquid coolant is directed against the base of the groove 18 and is caused to flow at a uniform rate along the inner surface of base portion 15 from the periphery of the base portion 15 to the center thereof and is removed at the center of the plunger.

I have found that the temperature of the external forming or molding surfaces of the plunger, namely, the external surface of base portion 15 and flange portion 16 are maintained within the critical temperatures, that is, between the temperature at which glass will stick to the forming surfaces and the temperature at which crizzles or wrinkles will be formed in the glass. As a result the plunger is of substantially isothermal surface temperature characteristics in use.

Figure 4:
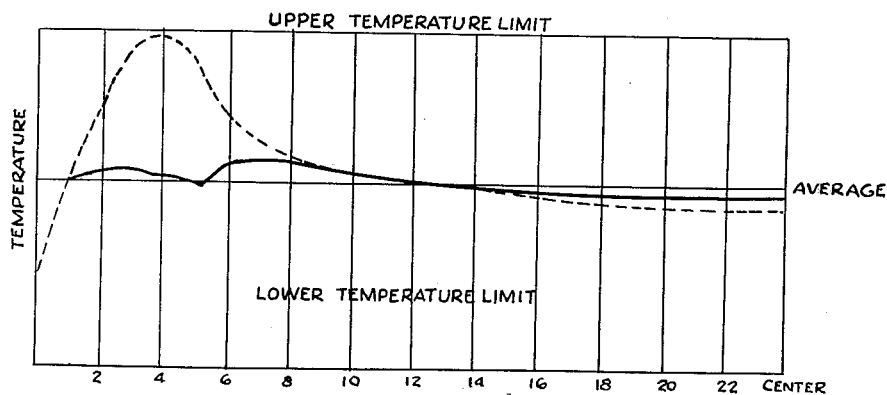
FIG. 4 is a curve of the temperature distribution in a plunger embodying the invention.

This condition of the isothermal surface temperature characteristics of the plunger is shown by reference to the curves shown in FIG. 4. The dotted line curve represents the temperature distribution from the center to the periphery of a plunger without the groove 18 and slot 19 and the solid line curve represents the temperature distribution from the center to the periphery of a plunger embodying the invention and including groove 18 and slot 19. It can be seen that for a plunger without a groove and slot there is a substantial increase in temperature at the periphery which is the area of juncture of the base portion and the flange portion. This may be contrasted to the plunger embodying the invention wherein there is substantially uniform temperature throughout the base portion and including the area of juncture so that it can be stated that the plunger has substantially isothermal characteristics.

Curve 4 is a graph representing the upper and lower limits of permissible temperature in the case of soda-lime glass, the range between these limits being approximately 450° F. As shown in dotted lines, a plunger of the prior art has portions thereof operating near the upper limit and other portions thereof operating near the lower limit.

As a result, there is very little permissible temperature variation in normal operation. Any shift of the temperature curve causes portions of the glass to exceed the limits for sticking or crizzling. On the other hand, a plunger embodying the invention has a relatively small temperature variation and it is possible to have substantial variation in temperature without causing crizzling or sticking. In practice, the plunger might be operated either in the medial zone as shown in FIG. 4 or it might be operated near the upper limit in forming glass articles such as television tube face plates where surface quality is important or nearer the lower limit in the case of pressing insulators or other ware where high speeds are desired and surface quality is not so critical.

Although various types of liquid coolant may be used, I have found that cooling by water produces satisfactory results. Although the slot 19 may be left open, I have found it preferable to fill the slot with an insulating material 30 such as asbestos.

Although I do not wish to be bound by the theory involved, in my opinion, the satisfactory results achieved in commercially producing glass articles having a base and a flange in large volume at low cost for commercial operation are due to the increased cooling achieved at the area of juncture of the base portion 15 and the flange portion 16 due to the presence of the groove 18. At the same time, a decreased cooling action on the flange portion 16 is provided thereby maintaining the flange portion at a higher temperature and avoiding the condition which normally exists, namely, the tendency of the flange portion 16 to cool and cause crizzles and wrinkles to be formed on the upper end of the flange of the glass article.

According to the invention it is possible to control the temperature in such a fashion that all the forming surfaces of the plunger are operating at temperatures well within the critical temperature conditions so that neither cold areas nor hot areas are present, even though the article which is being formed is of a configuration wherein the glass-forming surfaces will have a tendency to have both excessively hot and excessively cold areas.

I claim:

1. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, the improvement wherein said plunger is formed with a peripheral groove therein in the inner surface thereof opposite the molding surface thereof at the area of juncture of said base portion and flange portion, said plunger having a downwardly extending peripheral slot in the upper end of said flange portion extending around the entire flange portion, and means for cooling said plunger.

2. The combination set forth in claim 1 wherein heat insulating material is provided in said slot in said flange portion and substantially fills said slot.

3. The combination set forth in claim 1 wherein said means for cooling said plunger comprises means for directing coolant into said groove and causing said coolant to flow over the base portion of said plunger.

4. The combination set forth in claim 1 wherein the flange portion of said plunger has an area thereof cooperating with the mold to define the upper edge of the glass article being formed, the lower end of the slot in the flange portion extending below the upper edge of said area.

5. In an apparatus for forming a glass article having a base and a peripheral flange by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion, and a flange portion extending upwardly from the periphery of said base portion, the improvement wherein said plunger has a peripheral groove therein in the surface thereof opposite the molding surface thereof at the area of juncture of said base portion and flange portion, the depth of said groove being such that the heat conducted away by said groove matches the heat flowing into the plunger at the area of juncture of said base and flange portions, and said plunger having a downwardly extending peripheral slot in the upper end of said flange portion extending around the entire flange portion and cooling means for said plunger.

6. In an apparatus for forming a glass article by pressing a plunger downwardly into contact with a gob of glass placed in a mold having an internal molding surface corresponding to the external configuration of the article which is to be formed, said plunger having an external surface corresponding to the internal configuration of the article which is to be formed and comprising a base portion and a flange portion extending upwardly from the periphery of said base portion, the improvement wherein said plunger has a downwardly extending peripheral slot in the upper end of said flange portion intermediate the inner and outer surfaces of said flange portion, said slot extending around the entire periphery of said flange portion and being of substantially uniform cross section throughout, means for isolating said slot from the internal and external surfaces of said plunger, and means for cooling said plunger.

7. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion connected to said base portion by a sharply curved portion at the area of juncture with said base portion and extending upwardly from the periphery of said base portion, the improvement wherein said base portion of said plunger is of substantially uniform thickness throughout, said plunger having a groove in the inner surface thereof opposite the molding surface at the area of juncture of said flange portion and base portion, said groove at any cross section extending into the area of juncture of the flange portion and base portion toward the sharply curved surface on the exterior of the plunger, said groove extending around the entire periphery of said plunger and being of substantially uniform cross section throughout, the thickness of said plunger measured between the base of said groove and the external surface of said sharply curved portion being less than the thickness of said base portion and said flange portion measured between said external surface and said inner surface of said plunger, and cooling means for said plunger.

8. The combination set forth in claim 7 wherein the cross section of said groove gradually decreases from the upper end to the base thereof.

9. In an apparatus for forming a glass article by pressing a plunger downwardly into contact with a gob of glass placed in a mold having an internal molding surface corresponding to the external configuration of the article which is to be formed, said plunger having an external surface corresponding to the internal configuration of the article which is to be formed and comprising a base portion and a flange portion extending upwardly from the periphery of said base portion, the improvement wherein said plunger has a downwardly extending slot in the upper end of said flange portion, said slot extending around the entire periphery of said flange portion and being of substantially uniform cross section throughout, means for isolating said slot from the internal and external surfaces of said plunger, and cooling means for said plunger.

10. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, the improvement wherein said plunger is formed with a peripheral groove therein in the inner surface thereof opposite the molding surface thereof at the area of juncture of said base portion and flange portion, the thickness of said plunger measured between the base of said groove and the external surface of said sharply curved portion being less than the thickness of said base portion and said flange portion measured between said external surface and said inner surface of said plunger, said plunger having a downwardly extending peripheral slot in the upper end of said flange portion extending around the entire flange portion, means for isolating said slot from the internal and external surfaces of said plunger, and means for cooling said plunger.

References Cited in the file of this patent

UNITED STATES PATENTS

| | | |
|---|---|---|
| 1,028,413 | Woods | June 4, 1912 |
| 1,857,540 | Hardenberg | May 10, 1932 |
| 2,133,767 | Goodrich | Oct. 18, 1938 |
| 2,658,687 | Southworth | Nov. 10, 1953 |
| 2,839,870 | Denman | June 24, 1958 |

FOREIGN PATENTS

| | | |
|---|---|---|
| 4,531 | Great Britain | A.D. 1877 |